United States Patent
Kamiya (10) Patent No.: US 8,955,323 B2
(45) Date of Patent: Feb. 17, 2015

(54) COMPRESSOR

(75) Inventor: Yuji Kamiya, Shizuoka (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 522 days.

(21) Appl. No.: 12/828,774

(22) Filed: Jul. 1, 2010

(65) Prior Publication Data

US 2011/0000227 A1    Jan. 6, 2011

(30) Foreign Application Priority Data

Jul. 6, 2009 (JP) .................. 2009-160228

(51) Int. Cl.
| | |
|---|---|
| *F01K 23/06* | (2006.01) |
| *F25B 31/00* | (2006.01) |
| *F25B 41/00* | (2006.01) |
| *F25B 43/02* | (2006.01) |
| *F04C 23/00* | (2006.01) |
| *F04C 25/00* | (2006.01) |
| *F04C 29/04* | (2006.01) |

(52) U.S. Cl.
CPC ............ *F04C 23/006* (2013.01); *F04C 25/00* (2013.01); *F04C 29/04* (2013.01)
USPC ................. 60/670; 62/470; 62/505; 62/513

(58) Field of Classification Search
CPC ........... F02G 2280/00; F02G 2280/50; F02G 2254/15; F01K 23/10; F01K 17/025
USPC ........ 60/641.1, 659, 782, 618; 62/6, 115, 501
See application file for complete search history.

(56) References Cited

U.S. PATENT DOCUMENTS

| | | | | |
|---|---|---|---|---|
| 4,238,931 | A * | 12/1980 | Campbell | 62/183 |
| 4,342,201 | A * | 8/1982 | Ishii | 62/238.4 |
| 4,503,829 | A * | 3/1985 | Hasegawa et al. | 123/492 |
| 5,087,178 | A * | 2/1992 | Wells | 418/1 |
| 5,746,049 | A * | 5/1998 | Cullen et al. | 60/274 |
| 6,405,554 | B1 | 6/2002 | Kawakatu et al. | |
| 7,093,450 | B2 * | 8/2006 | Jimenez Haertel et al. | 62/91 |
| 7,269,956 | B2 * | 9/2007 | Gericke et al. | 60/782 |
| 2002/0092297 | A1 * | 7/2002 | Hertzberg | 60/295 |

(Continued)

FOREIGN PATENT DOCUMENTS

| | | |
|---|---|---|
| CN | 1320203 A | 10/2001 |
| CN | 101059133 A | 10/2007 |

(Continued)

OTHER PUBLICATIONS

Chinese of Action dated Aug. 1, 2012 in Chinese Patent Application No. 201010226267.4.

(Continued)

*Primary Examiner* — Thomas Denion
*Assistant Examiner* — Mickey France
(74) *Attorney, Agent, or Firm* — McDermott Will & Emery LLP (57) ABSTRACT

To improve the exhaust heat recovery efficiency, a compressor includes a heat exchanger for cooling a gas, coolant, water, or oil heated by the compressor during compressor operation by heat exchange with a working fluid, for circulating the working fluid of a Rankine cycle. The Rankine cycle is implemented by the heat exchanger, an expander, a condenser, and a circulating pump to circulate the working fluid through the cycle.

9 Claims, 5 Drawing Sheets

(56) References Cited

U.S. PATENT DOCUMENTS

| | | | |
|---|---|---|---|
| 2005/0193734 A1* | 9/2005 | Iwanami et al. | 60/657 |
| 2007/0175212 A1* | 8/2007 | Uno et al. | 60/519 |
| 2007/0193254 A1* | 8/2007 | Johannes | 60/286 |
| 2007/0245732 A1 | 10/2007 | Uno et al. | |
| 2008/0166253 A1* | 7/2008 | Fujimoto et al. | 418/201.1 |
| 2008/0306631 A1* | 12/2008 | Huang | 700/271 |
| 2009/0049825 A1* | 2/2009 | Ohashi | 60/285 |
| 2009/0087320 A1 | 4/2009 | Tanaka et al. | |
| 2009/0165456 A1 | 7/2009 | Masada | |
| 2009/0188240 A1* | 7/2009 | Suzuki et al. | 60/286 |
| 2011/0072794 A1* | 3/2011 | Van Nieuwstadt et al. | 60/285 |
| 2011/0072799 A1* | 3/2011 | Bidner et al. | 60/286 |
| 2011/0094482 A1* | 4/2011 | Weber et al. | 123/568.12 |

FOREIGN PATENT DOCUMENTS

| | | | |
|---|---|---|---|
| GB | 2367333 A | 4/2002 | |
| JP | 56-115896 A | 9/1981 | |
| JP | 56-165708 A | 12/1981 | |
| JP | 60-111092 A | 6/1985 | |
| JP | 61-237804 | 10/1986 | |
| JP | 63-280805 | 11/1988 | |
| JP | 03-290089 B2 | 12/1991 | |
| JP | 10-220885 A | 8/1998 | |
| JP | 10-274010 A | 10/1998 | |
| JP | 2002-115921 A | 4/2002 | |
| JP | 2006-009592 A | 1/2006 | |
| JP | 2006-037760 A | 2/2006 | |
| JP | 2006-125302 | 5/2006 | |
| JP | 2006-316696 A | 11/2006 | |
| JP | 2007-146766 A | 6/2007 | |
| JP | 2009-085045 A | 4/2009 | |
| JP | 2010-031874 A | 2/2010 | |
| WO | WO-02/070900 A1 | 9/2002 | |
| WO | WO-2006/120819 A1 | 11/2006 | |
| WO | WO 2007137373 A1 * | 12/2007 | F04B 35/00 |

OTHER PUBLICATIONS

English translation of Japanese Office Action issued in Japanese Application No. 2009-160228 mailed Jun. 25, 2013.

English translation of Chinese Office Action issued in Chinese Appliction No. 201010226267.4 issued on Nov. 28, 2013.

Japanese Notice of Reasons for Rejection, w/ English translation thereof, issued in Japanese Patent Application No. JP 2013-172456 dated May 13, 2014.

Japanese Office Action issued in Japanese Application No. 2013-172456 dated Jul. 8, 2014.

English translation of Presentation of publications and the like submitted in Japanese Application No. 2013-172456 dated Jun. 13, 2014.

English translation Notice of Reasons for Rejection Japanese Patent Application No. 2013-172456 dated Oct. 7, 2014.

* cited by examiner

COMPRESSOR

RELATED APPLICATION

This application claims the benefit of priority from Japanese Application No. JP-2009-160228 filed on Jul. 6, 2009 entitled "Compressor," the disclosure of which also entirely incorporated herein by reference.

TECHNICAL FIELD

The present subject matter relates to a compressor for compressing gas, and more particularly, to a compressor for recovering exhaust heat.

BACKGROUND

In compressors, a large amount of heat is generated, for example, at the time of air compression. This causes the temperature of compressed air to rise. Compressed air may be used at high temperature, however, generally it is cooled to close-to-ambient temperature and also dehumidified for its use. Also, in compressors, oil or water may be used for lubrication or cooling, and the oil or water heated to a high temperature is cooled. The heat generated in compressors in this manner is exhausted through compressed air, oil, water, or the like. As one of the devices for recovering such exhaust heat, a device with thermoelectric conversion elements installed in a compressor body and discharge piping has been proposed (for example, see Japanese Published Unexamined Patent Application No. 2006-125302). According to the related art disclosed in Japanese Published Unexamined Patent Application No. 2006-125302, heat from high-temperature portions such as the compressor body and the discharge piping is converted to electric power by the thermoelectric conversion elements, and the voltage is converted through a regulator so as to supply power to auxiliary devices such as a cooling fan and an oil pump.

SUMMARY

However, the related art described above has the following problem. That is, in the related art disclosed in Japanese Published Unexamined Patent Application No. 2006-125302, the thermoelectric conversion elements are installed in the compressor body and the discharge piping, however, since the surface area of the high-temperature portions such as the compressor body and the discharge piping is limited, a large area for the thermoelectric conversion elements cannot be provided. Therefore, there has been room for the improvement in exhaust heat recovery efficiency.

Accordingly, an object of the present subject matter is to provide a compressor capable of improving the exhaust heat recovery efficiency. In order to achieve the above-mentioned object, according to one example, a compressor, comprising: a compressor body for compressing gas; a heat exchanger for cooling a gas, coolant, water, or oil heated by the compressor during compressor operation by heat exchange with a working fluid, for circulating the working fluid; an expander for expanding the working fluid heated and vaporized by the heat exchanger to generate driving force; a condenser for cooling and liquefying the working fluid supplied from the expander to supply the liquefied working fluid to the heat exchanger; and a circulating pump for circulating the working fluid among the heat exchanger, the expander, and the condenser. The heat exchanger, the expander, the condenser, and the circulating pump implement a Rankine cycle.

In this manner, in the example, the Rankine cycle, composed of the heat exchanger, the expander, the condenser, and the circulating pump, is implemented as an exhaust heat recovery system, thereby allowing recovery of exhaust heat in the compressor and generation of driving force. It is therefore possible to improve the exhaust heat recovery efficiency.

In the example, preferably, the at least one heat exchanger includes a plurality of heat exchangers, and the plurality of heat exchangers are series-connected in such a manner that the working fluid circulates in increasing order of exchange heat quantity. With this configuration, the working fluid may be efficiently vaporized. It is therefore possible to improve the exhaust heat recovery efficiency.

According to the example, it is possible to improve the exhaust heat recovery efficiency.

Additional advantages and novel features will be set forth in part in the description which follows, and in part will become apparent to those skilled in the art upon examination of the following and the accompanying drawings or may be learned by production or operation of examples. The advantages of the present teachings may be realized and attained by practice or use of various aspects of the methodologies, instrumentalities and combinations set forth in the detailed example discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instance, well known methods, procedures, components, and/or circuitry have been described at a relatively high-level, without detail, in order to avoid unnecessarily obscuring aspects of the present teachings.

Figure 1:
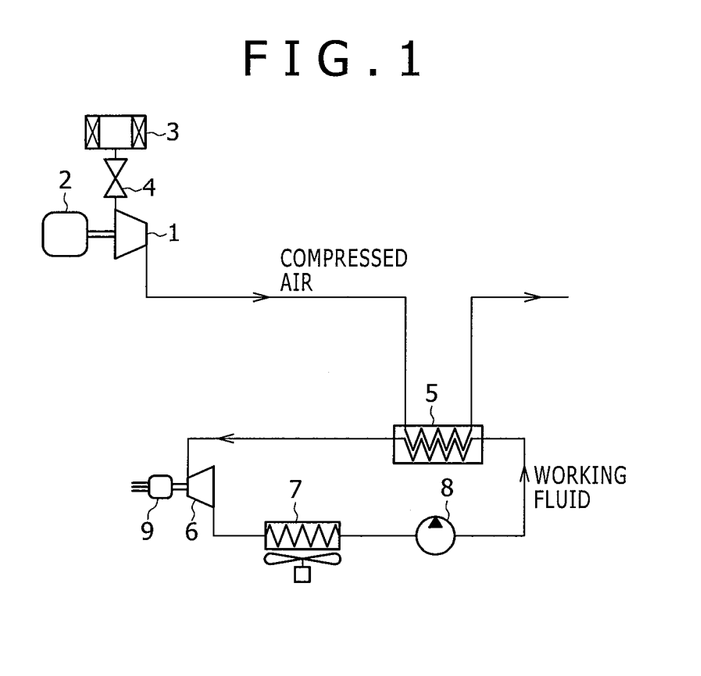
FIG. 1 is a diagram showing the configuration of a compressor according to a first example.

A first example will be described with reference to FIG. 1. FIG. 1 is a schematic diagram showing the configuration of the primary parts of a compressor according to this example.

Referring to FIG. 1, an oil-free and non-water supply compressor includes: a screw compressor body 1; a motor (such as an electric motor 2 or an internal combustion engine) connected to the compressor body 1 through a gear system (speed increasing gear) not shown in the figure to drive the compressor body 1; and a suction filter 3 and a suction throttle valve 4 provided on a suction side of the compressor body 1. When the compressor body 1 is driven by the electric motor 2, air (atmosphere) is sucked through the suction filter 3 and the suction throttle valve 4 to be compressed to a predetermined pressure so as to discharge the compressed air. In addition, a controller (not shown) switches the suction throttle valve 4 from an open state to a closed state to thereby switch from load operation to no-load operation.

Here, the main feature of this example is that, on a discharge side of the compressor body 1, there is provided a heat exchanger 5 for cooling compressed air, for example, to close-to-ambient temperature, and that there is also provided an exhaust heat recovery system for recovering exhaust heat from compressed air through the heat exchanger 5. This exhaust heat recovery system includes: the heat exchanger 5 for heating and vaporizing a working fluid (water or a refrigerant) by means of heat exchange with compressed air; an expander 6 for expanding the working fluid vaporized by the heat exchanger 5 to generate driving force; a condenser 7 for cooling and liquefying the working fluid from the expander 6; and a circulating pump 8 for supplying the working fluid liquefied by the condenser 7 to the heat exchanger 5, thereby constituting a Rankine cycle.

Furthermore, a generator 9 is connected to the expander 6 to convert the driving force generated by the expander 6 to electric power. The electric power generated by the generator 9 is returned, for example, to a power supply system, thereby making it possible to cover the power to be supplied to other apparatuses (in other words, the electric power can be sold to power companies). In that case, an inverter (not shown) for frequency control of electric power may be connected to the generator 9.

The power generated by the generator 9 can cover the power to drive, for example, an auxiliary device (such as a cooling fan for ventilating the compressor) in the compressor. Also, for example, in a compressor mounted with an inverter (not shown) for controlling the rotational speed of the electric motor 2, the generator 9 may be connected to the inverter. That is to say, not only the power from a commercial power supply (a main power supply) but also the power from the generator 9 may be supplied to the inverter. In that case, a rotational speed controller (not shown) calculates a rotational speed command value based on a deviation between a discharge pressure of the compressor body 1 and a preset pressure to output the calculated rotational speed command value to the inverter. The inverter controls a switching element based on the rotational speed command value to produce a voltage waveform of a desired frequency and supply it to the electric motor 2.

In addition, a power supply control system (not shown) estimates power supply (that is, the power generation capacity of the generator 9) from the generator 9 to the inverter, and also adjusts power supply from the main power supply to the inverter so that the sum of the estimated power supply and the power supply from the main power supply to the inverter becomes a predetermined value. A more detailed explanation follows. The power generation capacity (that is, the recovered heat amount of the exhaust heat recovery system) of the generator 9 depends on the heating value of the compressor. Therefore, the power generation capacity is likely to increase as the heating value increases. The heating value of the compressor depends on the discharge pressure and the air quantity of the compressor body 1, or the rotational speed and the torque of the electric motor 2. Therefore, the power generation capacity of the generator 9 is estimated based on a detected value of the discharge pressure of the compressor body 1, a detected value (or a rotational speed command value) of the rotational speed of the electric generator 2, or a detected value of the torque current of the electric generator 2. Further, the recovered heat amount depends on the temperature of the compressed air or ambient temperature. Therefore, by using a detected value thereof, estimate accuracy is improved. In addition, the power supply from the main power supply is reduced according to the power generation capacity of the generator 9. It is therefore possible to apparently reduce the electric power required for the compressor and expect the energy-saving effect.

Next, the advantageous effect of this example will be described.

The oil-free and non-water supply compressor is operated in a state in which no oil or water is supplied to a compression chamber of the compressor body 1. For this reason, compressed air is heated to high temperature. For example, the temperature of the compressed air, compressed from atmospheric pressure to a pressure of 0.7 MPa (gauge pressure), is in the range of approximately 300° C. to 400° C. For the purpose of using this compressed air, it is cooled, for example, to close-to-ambient temperature by the heat exchanger 5. Also, in this example, the Rankine cycle, composed of the heat exchanger 5, the expander 6, the condenser 7, and the circulating pump 8, is implemented as the exhaust heat recovery system for recovering exhaust heat from compressed air, whereby the driving force generated by the expander 6 is converted to electric power by the generator 9. It is therefore possible to improve the exhaust heat recovery efficiency, as compared with the case where thermoelectric elements are installed in the compressor body 1 and the discharge piping.

Figure 2:
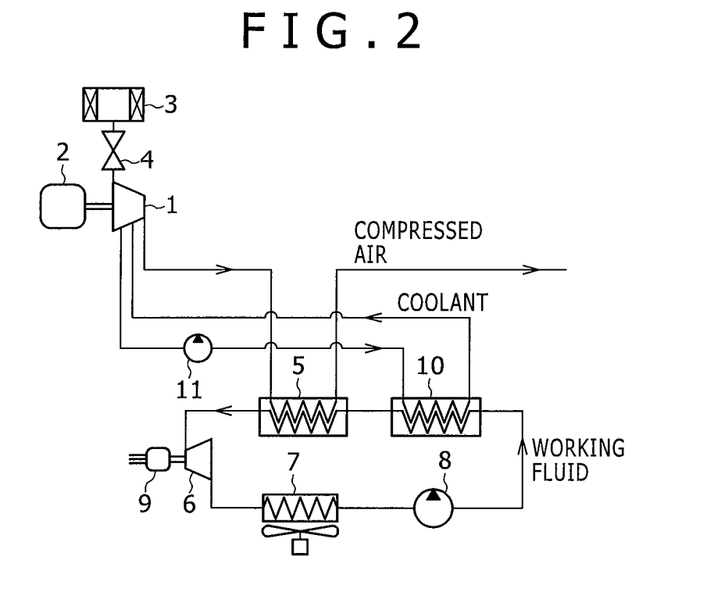
FIG. 2 is a diagram showing the configuration of a compressor according to a second example.

A second example will be described with reference to FIG. 2. FIG. 2 is a diagram showing the configuration of a compressor according to this example. In FIG. 2, the same elements as those in the above-described first example are designated by the same reference signs as those described above, and the descriptions thereof will not be repeated when appropriate.

In this example, a coolant flow path (not shown) through which coolant circulates is formed in a casing of the compressor body 1. Also, a coolant system for supplying coolant to the coolant flow path is provided. The coolant system includes: a heat exchanger 10 for cooling and supplying coolant to the coolant flow path of the compressor body 1; and a pump 11 for supplying to the heat exchanger 10 the coolant circulated through the coolant flow path of the compressor body 1 and heated.

Also, there is provided an exhaust heat recovery system for recovering exhaust heat from coolant through the heat exchanger 10 and recovering exhaust heat from compressed air through the heat exchanger 5. The exhaust heat recovery system includes: the heat exchanger 10 for heating a working fluid by means of heat exchange with coolant; the heat exchanger 5 for heating and vaporizing the working fluid heated by the heat exchanger 10, by means of heat exchange with compressed air; the expander 6 for expanding the working fluid vaporized by the heat exchanger 5 to generate driving force; the condenser 7 for cooling and liquefying the working fluid from the expander 6; and the circulating pump 8 for supplying the working fluid liquefied by the condenser 7 to the heat exchanger 10, thereby constituting a Rankine cycle.

Also in this example configured in this manner, it is possible to improve the exhaust heat recovery efficiency. In addition, in this example, exhaust heat is recovered not only from compressed air but also from coolant. It is therefore possible to further improve the exhaust heat recovery efficiency, compared to the above-described first example. Furthermore, in this example, the heat exchange amount of the heat exchanger 10 is smaller than that of the heat exchanger 5. Thus, the working fluid can be efficiently vaporized by allowing the working fluid to flow in order from the heat exchanger 10 to the heat exchanger 5. It is therefore possible to improve the exhaust heat recovery efficiency. It should be noted that, for example, when the heat exchange amount of the heat exchanger 5 is smaller than that of the heat exchanger 10, it is preferable to allow the working fluid to flow in order from the heat exchanger 5 to the heat exchanger 10.

It is to be noted that, although in the above-described second example the exhaust heat recovery system for recovering exhaust heat from coolant through the heat exchanger 10 and recovering exhaust heat from compressed air through the heat exchanger 5 has been described, there may alternatively be provided, for example, an exhaust heat recovery system for recovering exhaust heat only from coolant through the heat exchanger 10. More specifically, while not shown in the figure, the exhaust heat recovery system may include: the heat exchanger 10 for heating and vaporizing a working fluid by means of heat exchange with coolant; the expander 6 for expanding the working fluid vaporized by the heat exchanger 10 to generate driving force; the condenser 7 for cooling and liquefying the working fluid from the expander 6; and the circulating pump 8 for supplying the working fluid liquefied by the condenser 7 to the heat exchanger 10, thereby constituting a Rankine cycle.

Figure 3:
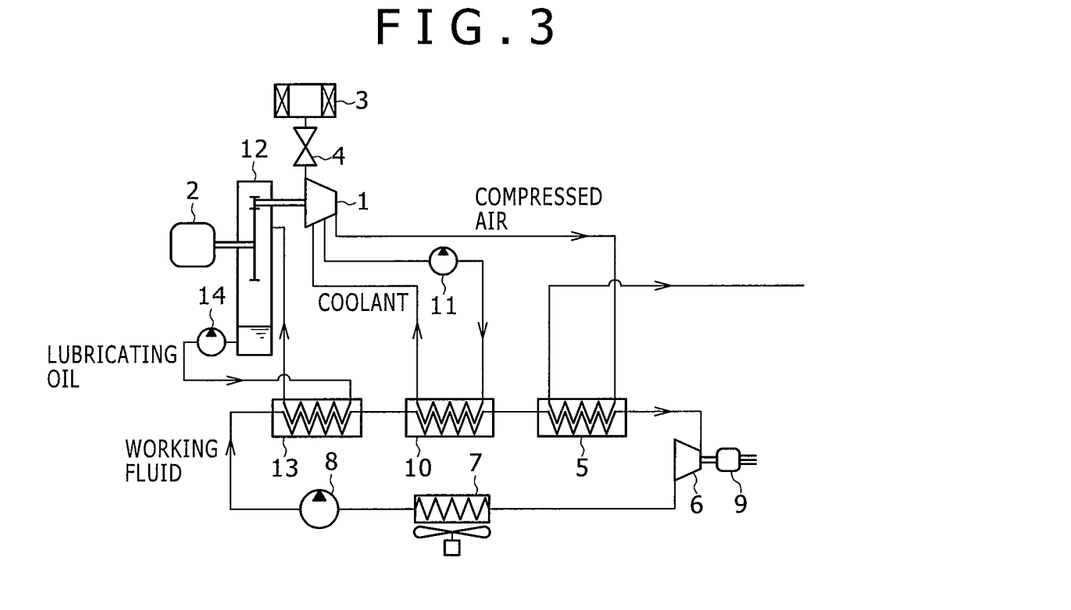
FIG. 3 is a diagram showing the configuration of a compressor according to a third example.

A third example will be described with reference to FIG. 3. FIG. 3 is a diagram showing the configuration of a compressor according to this example. In FIG. 3, the same elements as those in the above-described second example are designated by the same reference signs as those described above, and the descriptions thereof will not be repeated when appropriate.

In this example, the compressor body 1 is connected to the electric motor 2 through a gear system 12, and provided with a lubricating system for supplying lubricating oil to the gear system 12. The lubricating system includes: a heat exchanger 13 for cooling lubricating oil for the gear system 12; and a pump 14 for supplying the lubricating oil lubricated and heated by the gear system 12 to the heat exchanger 13.

Also, there is provided an exhaust heat recovery system for recovering exhaust heat from lubricating oil through the heat exchanger 13, recovering exhaust heat from coolant through the heat exchanger 10, and recovering exhaust heat from compressed air through the heat exchanger 5. The exhaust heat recovery system includes: the heat exchanger 13 for heating a working fluid by means of heat exchange with lubricating oil; the heat exchanger 10 for heating the working fluid heated by the heat exchanger 13, by means of heat exchange with coolant; the heat exchanger 5 for heating and vaporizing the working fluid heated by the heat exchanger 10, by means of heat exchange with compressed air; the expander 6 for expanding the working fluid vaporized by the heat exchanger 5 to generate driving force; the condenser 7 for cooling and liquefying the working fluid from the expander 6; and the circulating pump 8 for supplying the working fluid liquefied by the condenser 7 to the heat exchanger 13, thereby constituting a Rankine cycle.

Also in this example configured in this manner, it is possible to improve the exhaust heat recovery efficiency. In addition, in this example, exhaust heat is recovered not only from compressed air and coolant but also from lubricating oil. It is therefore possible to further improve the exhaust heat recovery efficiency, compared to the above-described second example. Furthermore, in this example, the heat exchange amount becomes larger in the order of the heat exchanger 13, the heat exchanger 10, and the heat exchanger 5. Thus, the working fluid can be efficiently vaporized by allowing the working fluid to flow in that order. It is therefore possible to improve the exhaust heat recovery efficiency. It should be noted that, for example, when the order of the heat exchange amount of the heat exchangers 5, 10, and 13 is different from that described in this example, it is preferable to allow the working fluid to flow in the corresponding order.

It is to be noted that, although in the above-described third example the exhaust heat recovery system for recovering exhaust heat from lubricating oil through the heat exchanger 13, recovering exhaust heat from coolant through the heat exchanger 10, and recovering exhaust heat from compressed air through the heat exchanger 5 has been described, there may alternatively be provided, for example, an exhaust heat recovery system for recovering exhaust heat from lubricating oil through the heat exchanger 13 and recovering exhaust heat from compressed air through the heat exchanger 5. More specifically, while not shown in the figure, the exhaust heat recovery system may include: the heat exchanger 13 for heating a working fluid by means of heat exchange with lubricating oil; the heat exchanger 5 for heating and vaporizing the working fluid heated by the heat exchanger 13, by means of heat exchange with compressed air; the expander 6 for expanding the working fluid vaporized by the heat exchanger 5 to generate driving force; the condenser 7 for cooling and liquefying the working fluid from the expander 6; and the circulating pump 8 for supplying the working fluid liquefied by the condenser 7 to the heat exchanger 13, thereby constituting a Rankine cycle.

Note that the first to third examples have been described by using an example of the case where the present subject matter is applied to the structure including the single-stage compressor body 1. However, the present subject matter is not limited thereto, but also can be applied to, for example, a structure including a second-stage compressor body. One of such modifications will be described with reference to FIG. 4.

Figure 4:
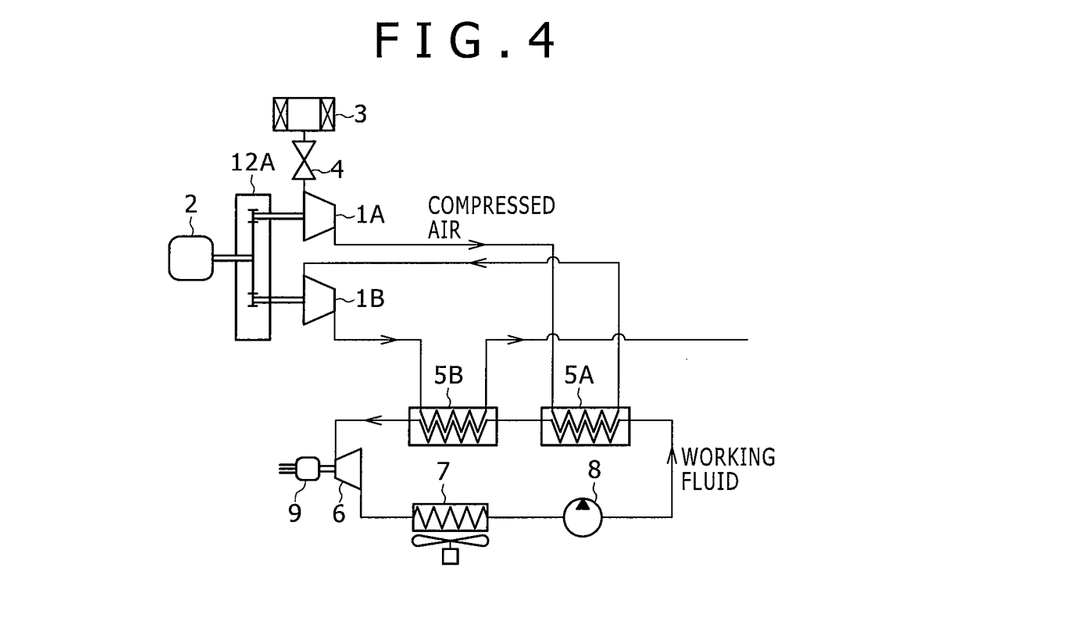
FIG. 4 is a diagram showing the configuration of a compressor according to one modified example.

FIG. 4 is a schematic diagram showing the configuration of a compressor according to this modification. In FIG. 4, the same elements as those in the above-described first example are designated by the same reference signs as those described above, and the descriptions thereof will not be repeated when appropriate.

According to this modification, the compressor includes: a low-pressure stage compressor body 1A; a heat exchanger 5A for cooling the air compressed by the compressor body 1A; a high-pressure compressor body 1B for further compressing the compressed air cooled by the heat exchanger 5A; and a heat exchanger 5B for cooling the air compressed by the compressor body 1B, for example, to close-to-ambient temperature. The compressor bodies 1A and 1B are connected to the electric motor 2 through a gear system 12A.

Also, there is provided an exhaust heat recovery system for recovering exhaust heat from compressed air through the heat exchangers 5A and 5B. The exhaust heat recovery system includes: the heat exchanger 5A for heating a working fluid by means of heat exchange with the compressed air generated by the low-pressure stage compressor body 1A; the heat exchanger 5B for heating and vaporizing the working fluid heated by the heat exchanger 5A, by means of heat exchange with the compressed air generated by the high-pressure compressor body 1B; the expander 6 for expanding the working fluid vaporized by the heat exchanger 5B to generate driving force; the condenser 7 for cooling and liquefying the working fluid from the expander 6; and the circulating pump 8 for supplying the working fluid liquefied by the condenser 7 to the heat exchanger 5A, thereby constituting a Rankine cycle.

Also in this modification configured in this manner, it is possible to improve the exhaust heat recovery efficiency, in the same manner as the above-described first example. Furthermore, in this modification, the heat exchange amount of the heat exchanger 5A is smaller than that of the heat exchanger 5B. Thus, the working fluid can be efficiently vaporized by allowing the working fluid to flow in order from the heat exchanger 5A to the heat exchanger 5B. It is therefore possible to improve the exhaust heat recovery efficiency. It should be noted that, for example, when the heat exchange amount of the heat exchanger 5B is smaller than that of the heat exchanger 5A, it is preferable to allow the working fluid to flow in order from the heat exchanger 5B to the heat exchanger 5A.

Figure 5:
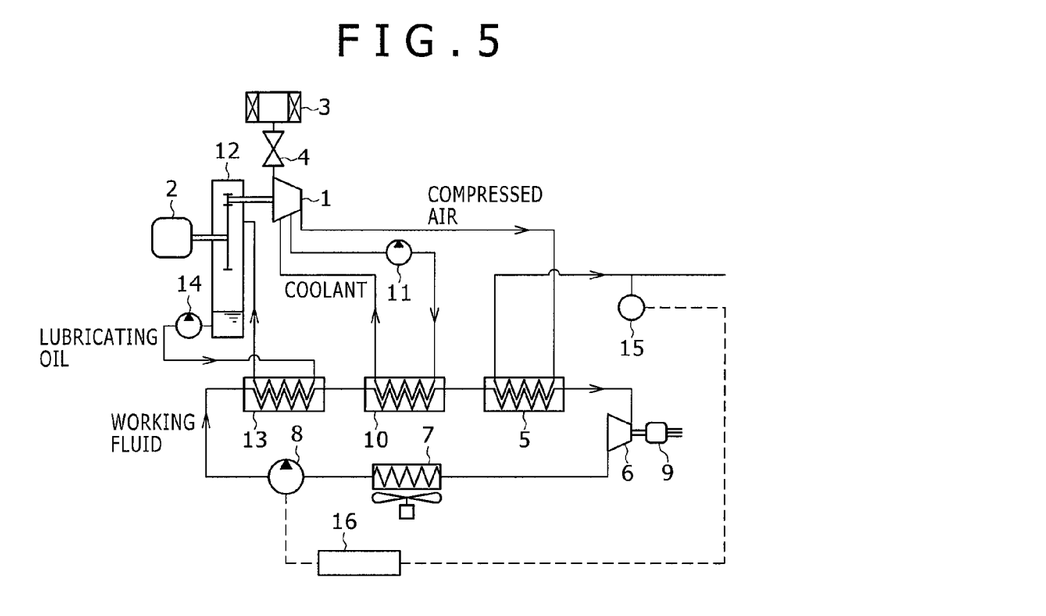
FIG. 5 is a diagram showing the configuration of a compressor according to a fourth example.

A fourth example will be described with reference to FIG. 5. FIG. 5 is a diagram showing the configuration of a compressor according to this example. In FIG. 5, the same elements as those in the above-described third example are designated by the same reference signs as those described above, and the descriptions thereof will not be repeated when appropriate.

In this example, a temperature sensor 15 for detecting the temperature of the compressed air is provided, for example, downstream of the heat exchanger 5, and a detection signal of the temperature sensor 15 is outputted to a controller 16. The controller 16 prestores a preset temperature of the compressed air in memory (memory means) to control the discharge rate (that is, the circulating volume of the Rankine cycle) of the circulating pump 8 so that the detected temperature of the compressed air, detected by the temperature sensor 15, becomes equal to the preset temperature. In concrete terms, for example, when the detected temperature of the compressed air is higher than the preset temperature, the discharge rate of the circulating pump 8 is increased depending on differences between the detected temperature of the compressed air and the preset temperature. On the other hand, for example, when the detected temperature of the compressed air is lower than the preset temperature, the discharge rate of the circulating pump 8 is reduced depending on differences between the detected temperature of the compressed air and the preset temperature. Thus, the temperature of the compressed air can be stabilized, regardless of load changes of the compressor.

Also in this example configured in this manner, it is possible to improve the exhaust heat recovery efficiency, in the same manner as the foregoing examples.

Figure 6:
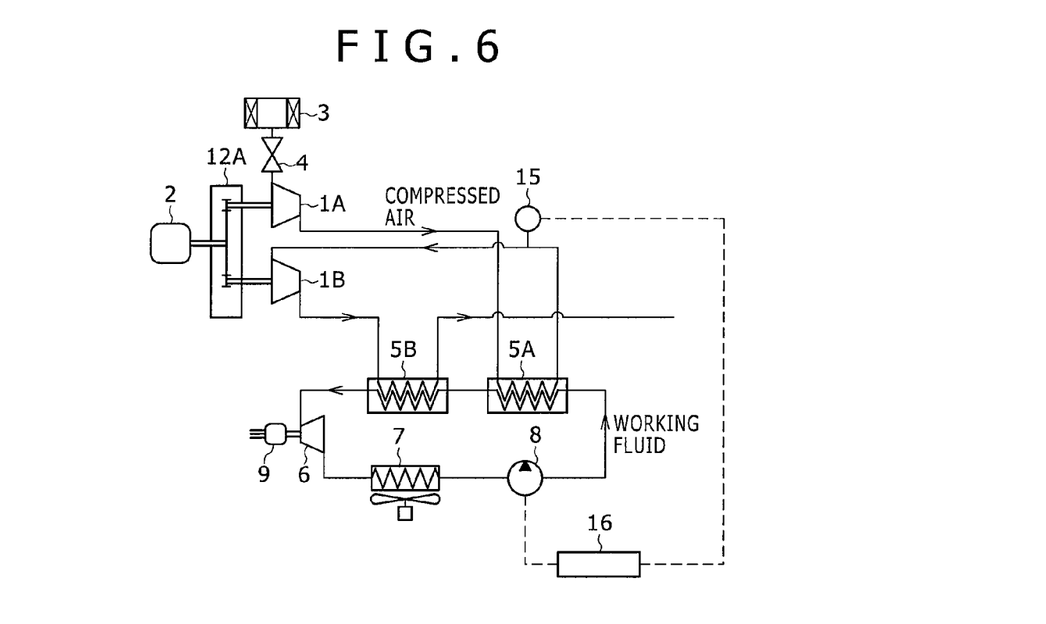
FIG. 6 is a diagram showing the configuration of a compressor according to another modified example.

Note that the fourth example has been described by using an example of the case where, in the structure including the exhaust heat recovery system for recovering exhaust heat through the heat exchangers 5, 10, and 13 in the same manner as the above-described third example, there are further provided the temperature sensor 15 and the controller 16. However, the present subject matter is not limited thereto, but also, for example, in the structure including the exhaust heat recovery system for recovering exhaust heat through the heat exchanges 5 and 10 in the same manner as the above-described second example, or in the structure including the exhaust heat recovery system for recovering exhaust heat through the heat exchanger 5 in the same manner as the above-described first example, there may be provided the temperature sensor 15 and the controller 16. Alternatively, in the structure including the exhaust heat recovery system for recovering exhaust heat through the heat exchangers 5A and 5B in the same manner as the above-described one modification, there may be provided with the temperature sensor 15 and the controller 16. In this case, for example, the temperature sensor 15 may be provided between the low-pressure stage compressor body 1A and the high-pressure stage compressor body 1B, as shown in FIG. 6. In those cases, the same effect as above can be also obtained.

Figure 7:
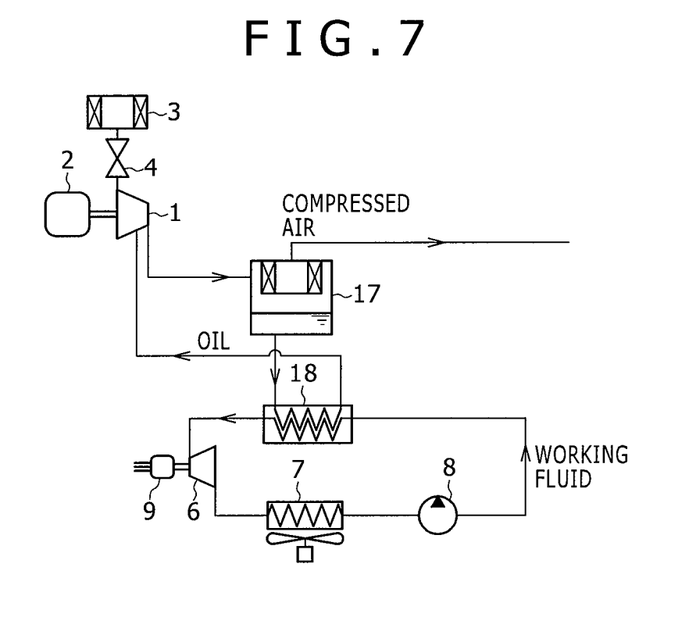
FIG. 7 is a diagram showing the configuration of a compressor according to a fifth example.

A fifth example will be described with reference to FIG. 7. FIG. 7 is a schematic diagram showing the configuration of a compressor according to this example. In FIG. 7, the same elements as those in the foregoing examples are designated by the same reference signs as those described above, and the descriptions thereof will not be repeated when appropriate.

In this example, the compressor is of the oil-lubricated type. An oil separator 17 for separating oil included in compressed air is provided on the discharge side of the compressor body 1. Also, there is provided an oiling system for supplying the oil separated by the oil separator 17 into the compression chamber of the compressor body 1. The oiling system includes a heat exchanger 18 for cooling oil to supply oil from the oil separator 17 to the heat exchanger 18 with the inner pressure of the oil separator 17. Further, while not shown in the figure, the oiling system is branched downstream of the heat exchanger 18 so as to supply oil into both the compression chamber of the compressor body 1 and the gear system.

Also, there is provided an exhaust heat recovery system for recovering exhaust heat from oil through the heat exchanger 18. The exhaust heat recovery system includes: the heat exchanger 18 for heating and vaporizing a working fluid by means of heat exchange with oil; the expander 6 for expanding the working fluid vaporized by the heat exchanger 18 to generate driving force; the condenser 7 for cooling and liquefying the working fluid from the expander 6; and the circulating pump 8 for supplying the working fluid liquefied by the condenser 7 to the heat exchanger 18, thereby constituting a Rankine cycle.

Also in this example configured in this manner, it is possible to improve the exhaust heat recovery efficiency, as compared with the case where thermoelectric elements are installed in the compressor body 1 and the discharge piping.

Figure 8:
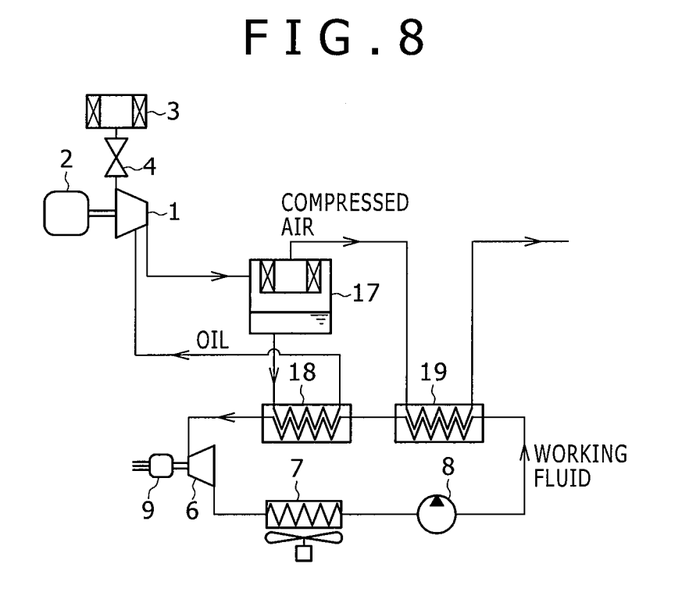
FIG. 8 is a diagram showing the configuration of a compressor according to a sixth example.

A sixth example will be described with reference to FIG. 8. FIG. 8 is a schematic diagram showing the configuration of a compressor according to this example. In FIG. 8, the same elements as those in the above-described fifth example are designated by the same reference signs as those described above, and the descriptions thereof will not be repeated when appropriate.

In this example, there is provided a heat exchanger 19 for cooling the compressed air separated by the oil separator 17.

Also, there is provided an exhaust heat recovery system for recovering exhaust heat from compressed air through the heat exchanger 19 and recovering exhaust heat from oil through the heat exchanger 18. The exhaust heat recovery system includes: the heat exchanger 19 for heating a working fluid by means of heat exchange with compressed air; the heat exchanger 18 for heating and vaporizing the working fluid heated by the heat exchanger 19, by means of heat exchange with oil; the expander 6 for expanding the working fluid vaporized by the heat exchanger 18 to generate driving force; the condenser 7 for cooling and liquefying the working fluid from the expander 6; and the circulating pump 8 for supplying the working fluid liquefied by the condenser 7 to the heat exchanger 19, thereby constituting a Rankine cycle.

Also in this example configured in this manner, it is possible to improve the exhaust heat recovery efficiency. In addition, in this example, exhaust heat is recovered not only from oil but also from compressed air. It is therefore possible to further improve the exhaust heat recovery efficiency compared to the above-described fifth example. Furthermore, in this example, the heat exchange amount of the heat exchanger 19 is smaller than that of the heat exchanger 18. Thus, the working fluid can be efficiently vaporized by allowing the working fluid to flow in order from the heat exchanger 19 to the heat exchanger 18. It is therefore possible to improve the exhaust heat recovery efficiency. It should be noted that, for example, when the heat exchange amount of the heat exchanger 18 is smaller than that of the heat exchanger 19, it is preferable to allow the working fluid to flow in order from the heat exchanger 18 to the heat exchanger 19.

Note that the fifth and sixth examples have been described by using an example of the case where the present subject matter is applied to the oil-lubricated compressor, but also can be applied to a water-supply compressor. More specifically, while not shown in the figure, the compressor may include, for example, a water separator provided on the discharge side of the compressor body for separating water included in compressed air, and a water heat exchanger for cooling and supplying the water separated by the water separator into the compression chamber of the compressor body 1, and there may be provided an exhaust heat recovery system for recovering exhaust heat from water through the water heat exchanger. Alternatively, the compressor may further include, for example, a compressed air heat exchanger for cooling the compressed air separated by the water separator, and there may be provided an exhaust heat recovery system for recovering exhaust heat from compressed air through the compressed air heat exchanger and recovering exhaust heat from water through the water heat exchanger. In those cases, the same effect as above can be also obtained.

Figure 9:
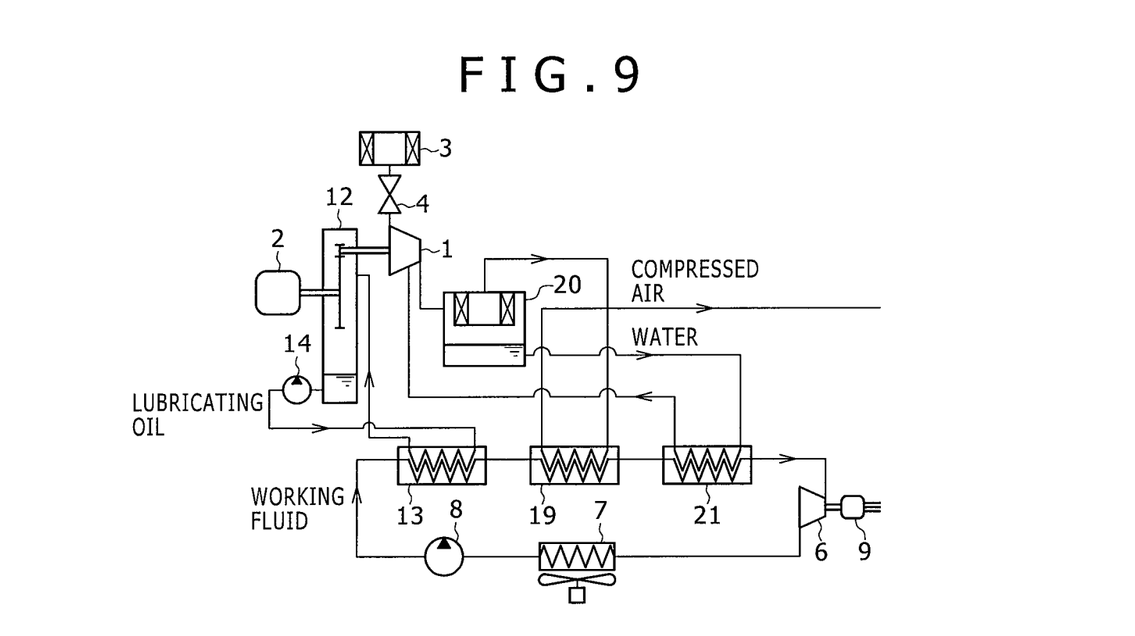
FIG. 9 is a diagram showing the configuration of a compressor according to a seventh example.

A seventh example will be described with reference to FIG. 9. FIG. 9 is a schematic diagram showing the configuration of a compressor according to this example. In FIG. 9, the same elements as those in the foregoing examples are designated by the same reference signs as those described above, and the descriptions thereof will not be repeated when appropriate.

In this example, the compressor is of the water-supply type. A water separator 20 for separating water included in compressed air is provided on the discharge side of the compressor body 1. Also, there is provided a water system for supplying the water separated by the water separator 20 into the compression chamber of the compressor body 1. The water system includes a heat exchanger 21 for cooling water to supply water from the water separator 20 to the heat exchanger 21 with the inner pressure of the water separator 20. Also, the heat exchanger 19 for cooling the compressed air separated by the water separator 20 is provided.

The compressor body 1 is connected to the electric motor 2 through the gear system 12, and provided with a lubricating system for supplying lubricating oil to the gear system 12. The lubricating system includes: the heat exchanger 13 for cooling lubricating oil for the gear system 12; and the pump 14 for supplying the lubricating oil lubricated and heated by the gear system 12 to the heat exchanger 13.

Also, there is provided an exhaust heat recovery system for recovering exhaust heat from lubricating oil through the heat exchanger 13, recovering exhaust heat from compressed air through the heat exchanger 19, and recovering exhaust heat from water through the heat exchanger 21. The exhaust heat recovery system includes: the heat exchanger 13 for heating a working fluid by means of heat exchange with lubricating oil; the heat exchanger 19 for heating the working fluid heated by the heat exchanger 13, by means of heat exchange with compressed air; the heat exchanger 21 for heating and vaporizing the working fluid heated by the heat exchanger 19, by means of heat exchange with water; the expander 6 for expanding the working fluid vaporized by the heat exchanger 21 to generate driving force; the condenser 7 for cooling and liquefying the working fluid from the expander 6; and the circulating pump 8 for supplying the working fluid liquefied by the condenser 7 to the heat exchanger 13, thereby constituting a Rankine cycle.

Also in this example configured in this manner, it is possible to improve the exhaust heat recovery efficiency. In addition, in this example, exhaust heat is recovered not only from water and compressed air but also from lubricating oil. It is therefore possible to improve the exhaust heat recovery efficiency. Furthermore, in this example, the heat exchange amount becomes larger in the order of the heat exchanger 13, the heat exchanger 19, and the heat exchanger 21. Thus, the working fluid can be efficiently vaporized by allowing the working fluid to flow in this order. It is therefore possible to improve the exhaust heat recovery efficiency. It should be noted that, when the order of the heat exchange amount of the heat exchangers 13, 19, and 21 is different from that described in this example, it is preferable to allow the working fluid to flow in the corresponding order.

Figure 10:
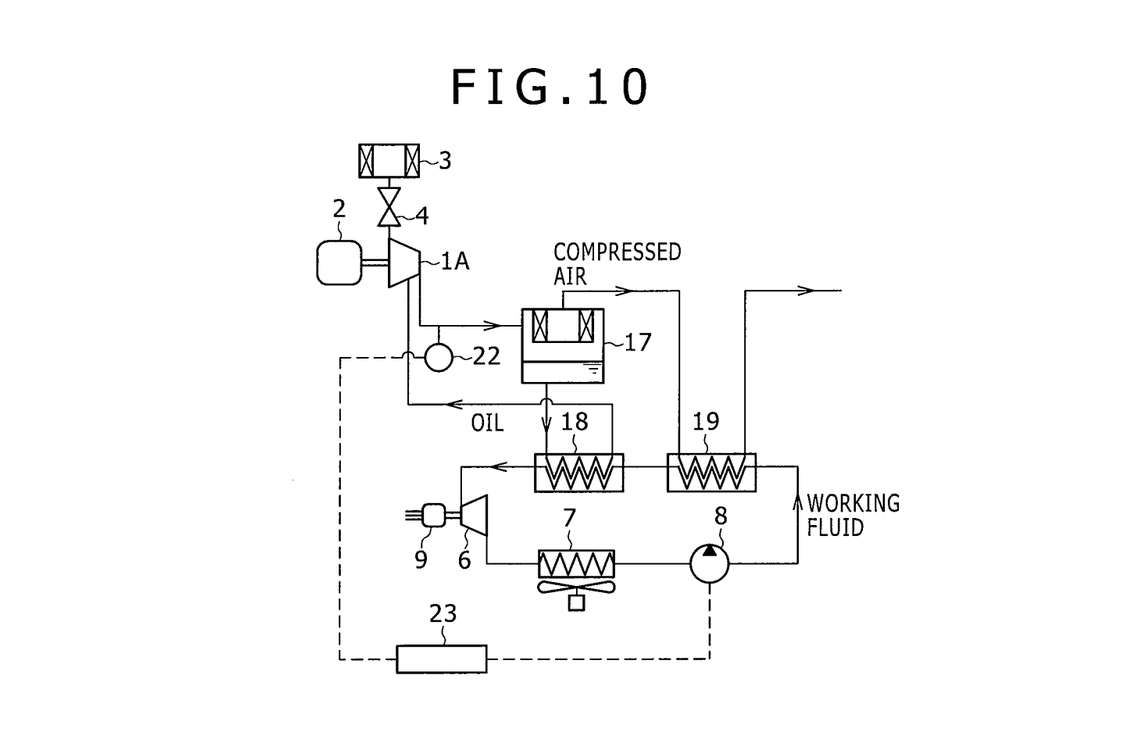
FIG. 10 is a diagram showing the configuration of a compressor according to an eighth example.

An eighth example will be described with reference to FIG. 10. FIG. 10 is a diagram showing the configuration of a compressor according to this example. In FIG. 10, the same elements as those in the above-described sixth example are designated by the same reference signs as those described above, and the descriptions thereof will not be repeated when appropriate.

In this example, there is provided a temperature sensor 22 for detecting, upstream of the oil separator 17, the temperature of compressed air, and a detection signal of the temperature sensor 22 is outputted to a controller 23. The controller 23 prestores a preset temperature of the compressed air in internal memory to control the discharge rate (that is, the circulating volume of the Rankine cycle) of the circulating pump 8 so that the detected temperature of the compressed air, detected by the temperature sensor 22, becomes equal to the preset temperature. In concrete terms, for example, when the detected temperature of the compressed air is higher than the preset temperature, the discharge rate of the circulating pump 8 is increased depending on differences between the detected temperature of the compressed air and the preset temperature. On the other hand, for example, when the detected temperature of the compressed air is lower than the preset temperature, the discharge rate of the circulating pump 8 is reduced depending on differences between the detected temperature of the compressed air and the preset temperature. Thus, regardless of load changes of the compressor, the temperature of the compressed air can be stabilized, and the precipitation of drain in oil can be suppressed.

Also in this example configured in this manner, it is possible to improve the exhaust heat recovery efficiency, in the same manner as the foregoing examples.

Note that the eighth example has been described by using an example of the case where, in the structure including the exhaust heat recovery system for recovering exhaust heat through the heat exchangers 18 and 19 in the same manner as the above-described sixth example, there are further provided the temperature sensor 22 and the controller 23. However, the present subject matter is not limited thereto, but also, for example, in the structure including the exhaust heat recovery system for recovering exhaust heat through the heat exchanger 18 in the same manner as the above-described fifth example, there may be provided the temperature sensor 22 and the controller 23. Alternatively, in the case, including the above-described seventh example, where the present subject matter is applied to the water-supply compressor, there may be provided the temperature sensor 22 and the controller 23. In those cases, the same effect as above can be also obtained.

While the present subject matter has been described by using an example of the compressor body for compressing air, the subject matter is not limited thereto, and the compressor body may compress other gases (such as a refrigerant). Also, while the present subject matter has been described by using an example of the compressor body of the screw type, the subject matter is not limited thereto, and other types of compressors (such as a reciprocating compressor) may be used. Further, while the present example has been described as using an electric motor for generating power of the compressor body, the subject matter is not limited thereto, and the other motors (such as an engine) may be provided. In addition, while the present subject matter has been described by using an example of the case where the driving force generated by the expander is converted to electric power by the generator, the subject matter is not limited thereto, and the driving force generated by the expander may drive other devices (such as an auxiliary device in the compressor). In those cases, the same effect as above can be also obtained.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An air compressor, comprising:
   a compressor body for compressing air in a state in which oil or water is supplied into a compression chamber, wherein a coolant flow path formed in a casing of the compressor body allows a coolant to circulate therethrough;
   a first heat exchanger for cooling and supplying the coolant to the coolant flow path to heat exchange with a working fluid, for circulating the working fluid;
   a second heat exchanger for cooling the air compressed and heated by the compressor body during compressor operation by heat exchange with a working fluid, for circulating the working fluid;
   a separator for separating oil or water included in the compressed air discharged from the compressor body;
   an expander for expanding the working fluid heated and vaporized by the second heat exchanger to generate a driving force;
   a condenser for cooling and liquefying the working fluid supplied from the expander to supply the liquefied working fluid to the second heat exchanger; and
   a circulating pump for circulating the working fluid among the first and second heat exchangers, the expander, and the condenser, wherein:
   the first heat exchanger, the second heat exchanger, the expander, the condenser, and the circulating pump implement a Rankine cycle,
   the second heat exchanger includes:
      a compressed air heat exchanger for cooling compressed air discharged from the compressor body, by heat exchange with the working fluid.

2. The air compressor according to claim 1, further comprising:
   a motor for generating power for the compressor body; and
   a gear system connected between the motor and the compressor body,
   wherein the second heat exchanger further includes a lubricating oil heat exchanger for cooling lubricating oil, heated by the gear system, by heat exchange with the working fluid.

3. The air compressor according to claim 1, wherein:
   first and second heat exchangers are series-connected in such a manner that the working fluid circulates in increasing order of exchange heat quantity.

4. The air compressor according to claim 2, wherein the first and second heat exchangers are series-connected in such a manner that the working fluid circulates in increasing order of exchange heat quantity.

5. The air compressor according to claim 1, further comprising:
   a temperature detector for detecting, upstream of the separator, temperature of the compressed air including oil or water; and
   a flow rate controller for controlling circulating flow rate of the Rankine cycle depending on a detection result of the temperature detector.

6. The air compressor according to claim 1, further comprising a generator connected to the expander.

7. The air compressor according to claim 6, wherein:
   the motor comprises an electric motor,
   the compressor further comprises an inverter for varying rotational speed of the electric motor, and
   the inverter is connected to the generator.

8. The air compressor according to claim 1, wherein the working fluid flows in a direction from the oil or water heat exchanger to the compressed air heat exchanger.

9. The air compressor according to claim 1, wherein the second heat exchanger further includes:
   an oil or water heat exchanger for cooling the oil or water separated by the separator, by heat exchange with the working fluid.

* * * * *